US006697205B2

(12) United States Patent
Cyrusian et al.

(10) Patent No.: US 6,697,205 B2
(45) Date of Patent: Feb. 24, 2004

(54) WRITE OUTPUT DRIVER WITH INTERNAL PROGRAMMABLE PULL-UP RESISTORS

(75) Inventors: Sasan Cyrusian, Scotts Valley, CA (US); Elmar Bach, Santa Cruz, CA (US)

(73) Assignee: Infineon Technologies AG, Munich (DE)

( * ) Notice: Subject to any disclaimer, the term of this patent is extended or adjusted under 35 U.S.C. 154(b) by 295 days.

(21) Appl. No.: 09/865,748

(22) Filed: May 25, 2001

(65) Prior Publication Data

US 2002/0176198 A1 Nov. 28, 2002

(51) Int. Cl.$^7$ ................................................. G11B 5/02
(52) U.S. Cl. .......................... 360/68; 360/66; 360/46; 327/110
(58) Field of Search ............................ 360/68, 66, 46, 360/67; 327/108, 110, 530, 194, 109; 324/210, 212, 226

(56) References Cited

U.S. PATENT DOCUMENTS

| 5,612,828 | A |   | 3/1997 | Brannon et al. |
|---|---|---|---|---|
| 5,638,012 | A |   | 6/1997 | Hashimoto et al. |
| 5,869,988 | A |   | 2/1999 | Jusuf et al. |
| 6,185,057 | B1 |   | 2/2001 | Masenas |
| 6,246,533 | B1 | * | 6/2001 | Davis et al. ................ 360/68 |
| 6,297,921 | B1 |   | 10/2001 | Price, Jr. et al. |

FOREIGN PATENT DOCUMENTS

DE         199 13 130 A1     1/2000
WO         WO 00/79521 A1    12/2000

OTHER PUBLICATIONS

PRML detection boosts hard–disk drive capacity, by Kevin D. Fisher et al, IEEE Spectrum, Nov. 1996, pp. 70–76.*
International Search Report for corresponding PCT application No. PCT/US02/16089, mailed on Sep. 24, 2002, 4 pages.
"Synchronous Recording Channels—PRML & Beyond", rev. 5.61 14.E. 18, 1999, published by Knowledge Tek, Inc., Broomfield, Colorado.
"PRML: Seagate Uses Space Age Technology" available on the Internet at http://www.seagate.com/support/kb/disc/prml.html, 2 pages, last accessed Apr. 9, 2001.
"Technologies—PRML" available on the Internet at http://www.idema.org/about/industry/ind_tech_prml.html, 1 page, last accessed Apr. 9, 2001.
"Reference Guide—Hard Disk Drives" available on the Internet at http://www.storagereview.com/guide2000/ref/hdd, 13 pages, last accessed Apr. 9, 2001.

(List continued on next page.)

*Primary Examiner*—Alan T. Faber
(74) *Attorney, Agent, or Firm*—Brinks Hofer Gilson & Lione

(57) ABSTRACT

A write output driver with internal programmable pull-up resistive devices is disclosed. The write output driver provides an integrated output driver circuit configurable to provide near end transmission line termination. The output driver is configured to provide transmission of a high-speed signal with increased frequencies over prior output drivers. The output impedance of the output driver is programmable and maintained substantially constant, despite ambient fluctuations. An internal bias signal generator is provided to control the impedance of the output driver.

30 Claims, 7 Drawing Sheets

OTHER PUBLICATIONS

"MR and PRML: Technologies in Synergy" available at on the Internet at http://www.lionsgate.com/Home/Baden/public_html_index/SCSI/Quantum_White_Papers/MR_Head/MR, 4 pages, last accessed Apr. 9, 2001.

"A Tutorial on Convolutional Coding with Viterbi Decoding" available on the Internet at http://pw1.netcom.com/~chip.f/viterbi/tutorial.html, 10 pages, last accessed Apr. 9, 2001.

* cited by examiner

WRITE OUTPUT DRIVER WITH INTERNAL PROGRAMMABLE PULL-UP RESISTORS

BACKGROUND

Computer hard disk drives, also known as fixed disk drives or hard disk drives, have become a de facto data storage standard for computer systems. Their proliferation can be directly attributed to their low cost, high storage capacity and reliability, in addition to wide availability, low power consumption, fast data transfer speeds and decreasing physical size.

Disk drives typically include one or more rotating magnetic platters encased within an environmentally controlled housing. The hard drive may have several read/write heads that interface with the magnetic platters. The disk drive may further include electronics for reading and writing data and for interfacing with other devices. The electronics are coupled with the read/write heads and include circuits to control head positioning and to generate or sense electromagnetic fields on the platters. The electronics encode data received from a host device, such as a personal computer, and translate the data into magnetic encodings, which are written onto the platters. When data is requested, the electronics locate the data, sense the magnetic encodings, and translate the encodings into binary digital information. Error checking and correction may also be applied to ensure accurate storage and retrieval of data.

The read/write heads detect and record the encoded data as areas of magnetic flux. The data are encoded by the presence or absence of a flux reversal between two contiguous areas of the platter. Data may be read using a method known as "Peak Detection" by which a voltage peak imparted in the read/write head is detected when a flux reversal passes the read/write head. However, increasing storage densities, requiring reduced peak amplitudes, better signal discrimination and higher platter rotational speeds are pushing the peaks in closer proximity. Thus, peak detection methods are becoming increasingly complex.

Advancements in read/write heads and in the methods of interpreting magnetic encodings have been made. For example, magneto-resistive ("MR") read/write heads have been designed with increased sensitivity and increased signal discrimination. In addition, technology known as Partial Response Maximum Likelihood ("PRML") has been developed. PRML disk drives function based an algorithm implemented in the disk drive electronics to read analog waveforms generated by the magnetic flux reversals. Instead of looking for peak values, PRML based drives digitally sample the analog waveform (the "Partial Response") and carry out advanced signal processing techniques to determine a most-likely bit pattern represented by the wave form (the "Maximum Likelihood"). PRML technology tolerates more noise in the magnetic signals, permitting use of lower quality platters and read/write heads, which also increases manufacturing yields and lowers costs.

With hard drives typically differentiated by factors such as cost/unit of storage, data transfer rate, power requirement, and form factor (physical dimensions), there is a need for enhanced hard drive components which prove cost effective in increasing storage capacity, operating speed, reliability and power efficiency. An example of an area includes PRML electronics for writing data having a write output driver circuit. The write output driver circuit provides transfer of a high-speed digital signal to the read/write head for recording data to the platters. Output driver circuits have included transistors configured with an open drain for driving externally coupled pull-up resistor devices. The external resistive devices draw output currents that cause a large voltage drop across the transmission lines at the high speeds of the signal. These designs may increase the cost and size of the output driver circuit. Another design includes configuring an output differential circuit with an internal source follower circuit. Application of these circuits may be limited because the output resistance of the source follower may vary with time and may be affected by environmental conditions, such as ambient temperature.

Accordingly, there is a need in the art for a write output driver having internal programmable pull-up resistors.

SUMMARY

A write output driver for use in a partial response, maximum likelihood ("PRML") read/write channel is disclosed. The write output driver includes internal programmable pull-up devices configured to drive a high-speed output voltage with low output impedance. The output driver may be provided in a data write circuit of a PRML based hard disk drive. The write output driver having internal programmable pull-up resistive devices provides an environmentally stable circuit capable of driving a high-speed output signal.

An embodiment for a write output driver may include a tail current source; a differential switch circuit; an internal pull-up circuit; and a second bias signal generator. The tail current source is coupled between a tail current node and a negative supply voltage node. The tail current source generates a tail current at the tail current node in response to a first bias signal applied at a first bias input node. The tail current is proportional to the first bias signal. The tail current source is biased to provide a desired current at a first output node and a second output node.

The differential switch circuit includes an input node to receiving a differential input voltage. The differential switch is coupled with the tail current node and may be configured to selectively switch the tail current between the first output node and the second output node in response to the input voltage.

The internal pull-up circuit is coupled with the first output node and the second output node. The internal pull-up circuit includes a second bias signal input node for receiving a second bias signal. The pull-up circuit generates an output voltage between the first output node and the second output node in response to the tail current at the output nodes. The pull-up circuit has an output impedance that may be programmed based on the second bias signal.

In an embodiment, the second bias signal generator controls the second bias signal to compensate for changes in the output impedance for the pull-up circuit due to ambient fluctuations. The second bias signal generator has an output impedance that is calibrated with a low-tolerance resistive device. The output impedance of the second bias signal generator is calibrated to an impedance that is proportionally matched with the internal pull-up circuit.

An embodiment of a method for driving a high-speed signal includes the acts of receiving a high-speed voltage signal at a differential voltage input; selectively switching a tail current between a first output node and a second output node in response to the high-speed voltage signal at the differential voltage input; programming an internal pull-up circuit to generate an output voltage with low output impedance at the first output node and at the second output node in response to tail current at the first output node and the second output node; calibrating an internal bias voltage source to have an output impedance substantially matched with the output impedance of the internal pull-up circuit; and controlling the calibrated bias voltage source to provide a bias voltage to maintain a substantially constant output impedance for the internal pull-up circuit.

The foregoing discussion of the summary of the invention is provided only by way of introduction. Nothing in this section should be taken as a limitation on the claims, which define the scope of the invention. Additional objects and advantages of the present invention will be set forth in the description that follows, and in part will be obvious from the description, or may be learned by practice of the present invention. The objects and advantages of the present invention may be realized and obtained by means of the instrumentalities and combinations particularly pointed out in the claims.

DETAILED DESCRIPTION

Figure 1A:
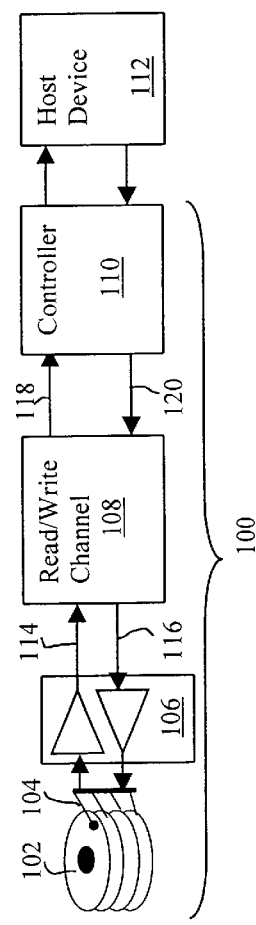
FIG. 1A is a block diagram of an hard drive coupled with a host device.

The embodiments described herein relate to a PRML based read/write channel. The read/write channel is coupled with read/write heads of the hard disk drive. Herein, the phrase "coupled with" is defined to mean directly connected to or indirectly connected through one or more intermediate components. Such intermediate components may include both hardware and software based components. During write operations, the read/write channel converts digital data from a host device into electrical impulses. The electrical impulses control the read/write head to magnetically record data to the hard disk. During read operations, the read/write channel receives an analog waveform magnetically sensed by the read/write heads. The read/write channel converts that waveform into the digital data.

The illustrated embodiments provide a write output driver for transferring a high-speed signal representing digital data to be recorded. The output driver circuit includes internal pull-up devices having a programmable output resistance. The internal resistive generate a differential output voltage proportional to a high-speed voltage input. The impedance of the pull-up resistive devices is controlled by an internal bias circuit. The bias circuit is calibrated to have an output impedance matched to the pull-up resistive devices. The bias circuit provides a bias signal to the pull-up devices to compensate for an impedance change due to ambient fluctuations, such as temperature. The output driver having internal programmable pull-up resistive devices drives the high-speed voltage output signal over varying environmental conditions and may be used as a near-end transmission line termination.

The present embodiments will be explained with reference to accompanying FIGS. 1 through 7. Referring now to FIG. 1, a block diagram for a hard drive 100 coupled with a host device 112 is shown. For clarity, some components, such as a servo/actuator motor control, are not shown. The drive 100 includes the magnetic surfaces and spindle motor 102, the read/write heads and actuator assembly 104, pre-amplifiers 106, a read/write channel 108 and a controller 110. The pre-amplifiers 106 are coupled with the read/write channel 108 via interfaces 114 and 116. The controller 110 interfaces with the read/write channel 108 via interfaces 118 and 120.

For reads from the hard disk 100, the host device 112 provides a location identifier that identifies the location of the data on the disk drive, e.g. a cylinder and sector address. The controller 110 receives this address and determines the physical location of the data on the platters 102. The controller 110 then moves the read/write heads into the proper position for the data to spin underneath the read/write heads 104. As the data spins underneath the read/write head 104, the read/write head 104 senses the presence or absence of flux reversals, generating a stream of analog signal data. This data is passed to the pre-amplifiers 106 which amplify the signal and pass the data to the read/write channel 108 via the interface 114. As will be discussed below, the read/write channel receives the amplified analog waveform from the pre-amplifiers 106 and decodes this waveform into the digital binary data that it represents. This digital binary data is then passed to the controller 110 via the interface 118. The controller 110 interfaces the hard drive 100 with the host device 112 and may contain additional functionality, such as caching or error detection/correction functionality, intended to increase the operating speed and/or reliability of the hard drive 100.

For write operations, the host device 112 provides the controller 110 with the binary digital data to be written and the location, e.g. cylinder and sector address, of where to write the data. The controller 110 moves the read/write heads 104 to a designated location and sends the binary digital data to be written to the read/write channel 108 via interface 120. The read/write channel 108 receives the binary digital data, encodes it and generates analog signals which are used to drive the read/write head 104 to impart the proper magnetic flux reversals onto the magnetic platters 102 representing the binary digital data. The signals are passed to the pre-amplifiers 106 via interface 116 which drive the read/write heads 104.

Figure 1B:
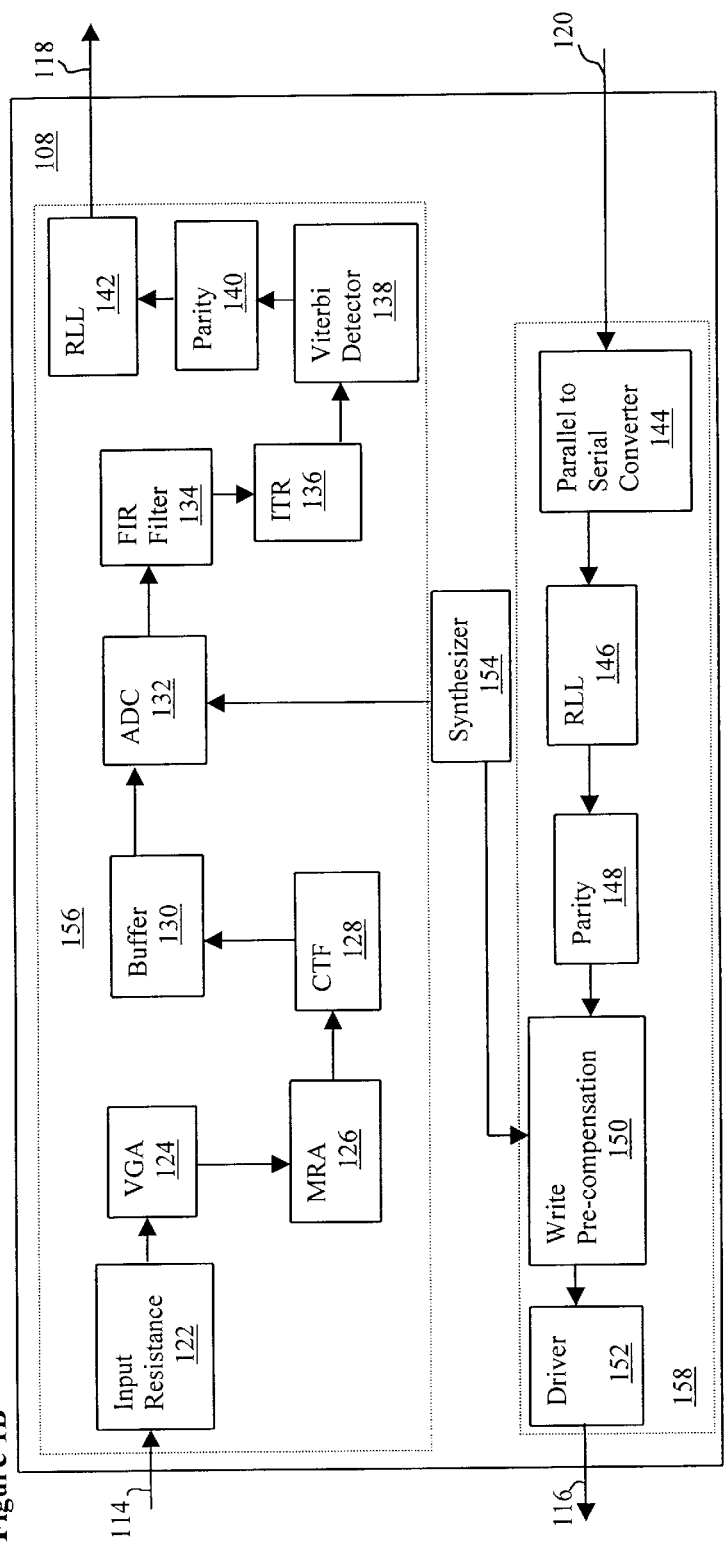
FIG. 1B depicts a block diagram of read/write channel for a hard drive.
Figure 2:
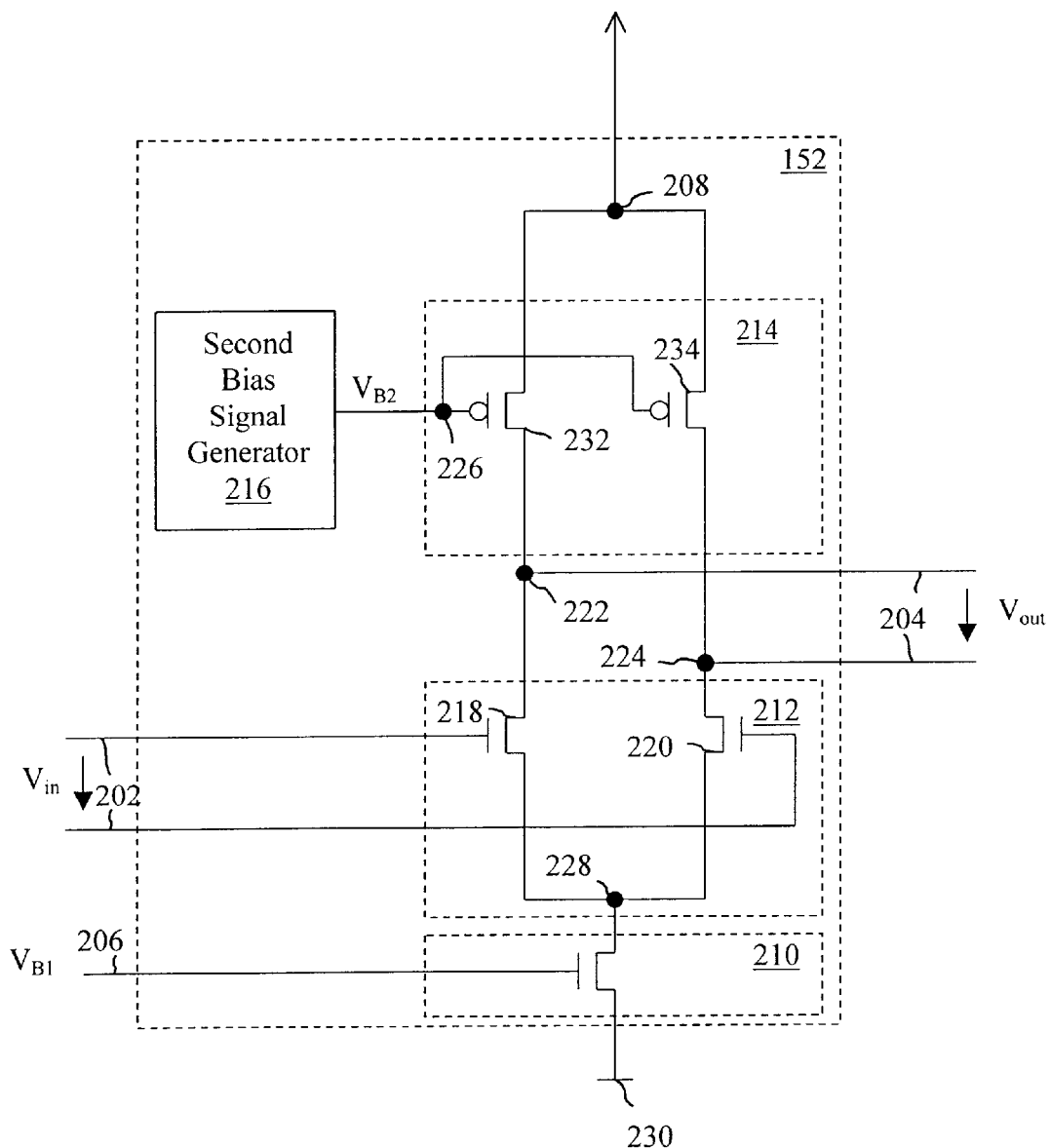
FIG. 2 is a schematic diagram for an embodiment of write output driver having internal programmable pull-resistive devices.

Referring to FIG. 1B, an exemplary read/write channel 108 is shown that supports Partial Response Maximum Likelihood ("PRML") encoding technology for use with the hard drive 100 of FIG. 1A. For clarity, some components have been omitted. The read/write channel 108 may be implemented as an integrated circuit using a complementary metal oxide semiconductor ("CMOS") process for transistors having an effective channel length of 0.18 micron. It will be appreciated that other process technologies and feature sizes may be used and that the circuitry disclosed herein may be further integrated with other circuitry comprising the hard disk electronics such as the hard disk controller logic. As was described, the read/write channel 108 converts between binary digital information and the analog signals representing the magnetic flux on the platters 102. The read/write channel 108 is divided into two main sections, the read path 156 and the write path 158. The read/write channel 108 further may further include a clock synthesizer 154. The clock synthesizer generates the clock signals required for operating the read/write channel 108. The exemplary clock synthesizer 154 includes a phased lock look ("PLL") (not shown) with a voltage controlled oscillator and various clock dividers to generate the necessary frequencies.

The read path 156 includes an attenuation circuit/input resistance 122, a variable gain amplifier ("VGA") 124, a magneto-resistive asymmetry linearizer ("MRA") 126, a continuous time filter ("CTF") 128, a buffer 130, an analog to digital converter ("ADC") 132, a finite impulse response ("FIR") filter 134, an interpolated timing recovery ("ITR") circuit 136, a Viterbi algorithm detector 138, a parity decoder 140, and a run-length-limited ("RLL") decoder 142. The amplified magnetic signals sensed from the platters 102 by the read/write head 104 are received by the read/write channel 108 via interface 114. The analog signal waveform representing the sensed magnetic signals is first passed through an input resistance 122 that is a switching circuit to attenuate the signal and account for any input resistance. The attenuated signal is then passed to a VGA 124 that amplifies the signal. The amplified signal is then passed to the MRA 126 that adjusts the signal for any distortion created by the recording process. Essentially, the MRA 126 performs the opposite function of the write-pre-compensation circuit 150 in the write path 158. The signal is next passed through the CTF 128, which may be essentially a low pass filter, to filter out noise. The filtered signal is then passed to the ADC 132 via the buffer 130 that samples the analog signal and converts it to a digital signal. The digital signal is then passed to a FIR filter 134 and then to a timing recovery circuit 136.

The timing recovery circuit 136 may be connected (not shown in the figure) to the FIR filter 134, the MRA 126 and the VGA 124 in a feedback orientation to adjust these circuits according to the signals received to provide timing compensation. The exemplary FIR filter 134 may be a 10 tap FIR filter. The digital signal is then passed to the Viterbi algorithm detector 138 that determines the binary bit pattern represented by the digital signal using digital signal processing techniques. The exemplary Viterbi algorithm detector 138 uses a 32 state Viterbi processor. The binary data represented by the digital signal is then passed to the parity decoder 140, which removes the parity bit, and then to the RLL decoder 142. The RLL decoder 142 decodes the binary RLL encoding symbols to the actual binary data. This data is then passed to the controller 110 via the interface 118.

The write path 158 may include a parallel-to-serial converter 144, a run-length-limited ("RLL") encoder 146, a parity encoder 148, a write pre-compensation circuit 150 and a write output driver circuit 152. The parallel to serial converter 144 receives data from the host device 112 via the interface 120 eight bits at a time. The converter 144 serializes the input data and sends a serial bit stream to the RLL encoder 146. The RLL encoder 146 encodes the serial bit stream into symbolic binary sequences according to a run-length limited algorithm for recording on the platters 102. The exemplary RLL encoder may use a 32/33 bit symbol code to ensure that flux reversals are properly spaced and that long runs of data without flux reversals are not recorded. The RLL encoded data is then passed to the parity encoder 148 that adds a parity bit to the data. In the exemplary parity encoder 148, odd parity is used to ensure that long run's of 0's and 1's are not recorded due to the magnetic properties of such recorded data. The signal is passed to a write pre-compensation circuit 150 that dynamically adjusts the pulse widths of the bit stream to account for magnetic distortions in the recording process. The adjusted signal is passed to a driver circuit 152 that drives the signal to the pre-amplifiers 106 via interface 116 to drive the read/write heads 104 and record the data. The exemplary driver circuit 152 may include a pseudo emitter coupled logic ("PECL") driver circuit that generates a differential output to the pre-amplifiers 106.

Figure 3:
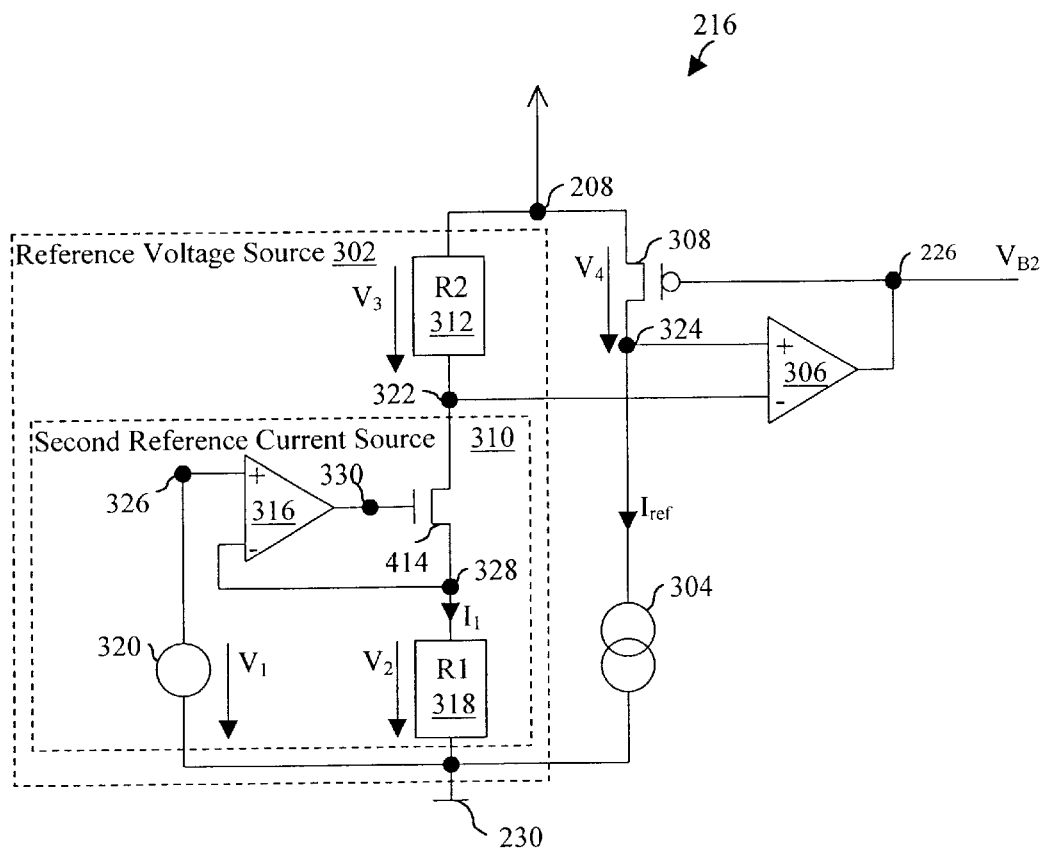
FIG. 3 is a schematic diagram for an embodiment of a bias signal generator for an write output driver.

Referring now to FIG. 3, an embodiment for a write output driver ("Output Driver") circuit 152 is shown that includes an internal pull-up circuit 214. The output driver 152 provides an integrated circuit with an internal programmable pull-up circuit to provide a low-impedance output for a high-speed output signal. The output impedance of output driver is controlled to maintain a substantially constant output voltage magnitude at a substantially constant output impedance, despite ambient fluctuations. In addition, the output driver 152 is configured to provide an output signal for a near-end transmission. The output driver 152 is configured to provide an output signal at increased frequencies over prior art output drivers.

The output driver 152 has a voltage input 202, a voltage output 204, and a first bias signal input node 206. The output driver 152 is coupled between a positive supply voltage node 208 and a negative supply voltage node 230. In an embodiment, a positive supply voltage substantially equal to or less than 3.3 Volts is applied at the positive supply voltage node 208 and a negative voltage substantially 0 Volts (Ground) is applied to the negative supply voltage node 230.

The output driver 152 receives a high-speed differential voltage input signal at the voltage input 202 and a first bias signal at the first bias input node 206. The output driver 152 generates an output voltage signal at the voltage output 204. The voltage output 204 has an output impedance that is matched to the circuit with which it is coupled. In an embodiment, the impedance of the voltage output 204 is between 20 Ohms and 60 Ohms. The output voltage signal is proportional to the differential voltage input signal. The proportional relationship of the voltage output signal to the differential voltage input signal is based on the first input bias signal. In an embodiment, the input voltage signal has a magnitude substantially equal to or less than 1.8 Volts and the output voltage signal has a magnitude substantially equal to 500 milliVolts. The magnitude output voltage signal may vary based on the first bias input signal.

The output driver 152 includes a tail current source 210, a differential switch circuit ("Switch Circuit") 212, the internal pull-up circuit 214, and a second bias signal generator 216. The tail current source 210 is coupled between the negative supply voltage node 230 and a current node 228. The tail current source 210 is further coupled with the first bias signal input node 206. The tail current source 210 is configured to draw a current at the current node 228 in response to the first bias signal at the first bias signal input node 206. The tail current source 210 controls the amount of tail current from the current node 228 to the negative supply voltage node 230 based on the first bias signal. In an embodiment, the tail current source 210 may be one or more NMOS transistor having a drain that is coupled with the current node 228, a source coupled with the negative supply voltage node 230 and a gate coupled with the first bias signal input node 206. When the tail current source 210 is configured as an NMOS transistor, the tail current is the source-to-drain current.

The switch circuit 212 is coupled with the tail current source at the current node 228 and with the voltage input 202. The switch circuit 212 selectively switches the tail current to a first output node 222 and to a second output node 224. The switch circuit 212 switches the tail current based on the differential voltage input signal at the voltage input 202. By way of example, the differential voltage input signal has an amplitude of 1.8 Volts. The switch circuit switches the tail current to the first output node 222 when the differential voltage input signal has a positive polarity with an amplitude of 1.8 Volts and switches the tail current to the second output node 224 when the differential voltage input signal has a negative polarity with an amplitude of 1.8 Volts.

In an embodiment, the switch circuit 212 includes a first NMOS transistor 218 and a second NMOS transistor 220. The first NMOS transistor 218 and the second NMOS transistor 220 are configured as a differential switch circuit. The first NMOS transistor 218 has a drain coupled with the first output node 222, a source coupled with the current node 228, and a gate coupled with the voltage input 202. The second NMOS transistor 220 has a drain coupled with the second output node 224, a source coupled with the current node 228, and a gate coupled with the voltage input 202.

The internal pull-up circuit 214 is coupled with the switch circuit 212 at the first output node 222 and the second output node 224 and coupled with the second bias signal generator 216 at a second bias signal node 226. The pull-up circuit 214 may be further coupled with the positive supply voltage node 208. The pull-up circuit 214 generates an output voltage at the output nodes 222 and 224 in response to tail current at the output nodes 222 and 224. The pull-up circuit 214 has a programmable output impedance that is based on the second bias signal. The tail current at the output nodes 222 and 224 creates a potential at the output nodes 222 and 224 due to the programmable output impedance of the pull-up circuit coupled between the output nodes 222 and 224 and the positive supply voltage node 208. In an embodiment, the pull-up circuit 214 includes a matched PMOS transistor pair including a first pull-up PMOS transistor 232 and a second PMOS transistor 234. The PMOS transistors 232 and 234 are configured as pull-up resistive devices. The PMOS transistors 232 and 234 have a source coupled with the positive supply voltage node 208 and a gate coupled with the second bias signal node 226. The first PMOS transistor 232 has a drain coupled with the first output node 222 and the second PMOS transistor has a drain coupled with the second output node 224.

The second bias signal generator 216 is coupled with the pull-up circuit at the second bias signal node 226. The second bias signal generator 216 generates the second bias signal at the second bias signal node 226. The second bias signal generator 216 controls the second bias signal to maintain a substantially constant impedance of the pull-up circuit. The second bias signal generator 216 varies the second bias signal at the second bias signal node 226 to compensate for impedance changes in the PMOS transistors 232 and 234 due to ambient temperature changes. In an embodiment, the second bias signal generator 216 has an output impedance calibrated to match the impedance of the PMOS transistors 232 and 234. The output impedance of the second bias signal generator is calibrated using a low-tolerance resistive device. In one embodiment, the low-tolerance external resistive device is an external resistor.

Referring now to FIG. 3, an embodiment for a second bias signal generator ("Bias Generator") 216 is shown. The bias signal generator 216 is configured as a bias voltage source. The bias generator 216 includes a replica transistor 308, an error amplifier 306, a reference voltage source 302, and a reference current source 304. When the second bias genera-tor 216 is configured as a bias voltage source, the second bias signal is a bias voltage $V_{B2}$.

The replica transistor 308 is configured to receive a reference current $I_{ref}$. The replica transistor 308 has a source coupled with the positive supply voltage node 208, a drain coupled with a reference current node 324, and a gate coupled with the second bias signal node 226. The replica transistor 308 is configured to have a programmable source-to-drain resistance based on a source-to-gate voltage. The replica transistor 308 has an output impedance substantially matched to the PMOS transistors 232 and 234. The output impedance of the replica transistor 308 may vary substantially linearly with the impedance of the PMOS transistors 232 and 234. When the impedance of the PMOS transistors 232 and 234 changes due to temperature changes, the impedance of the replica transistor 308 will track the impedance changes. When the impedance of the replica transistor 308 changes, the second bias voltage $V_{B2}$ is adjusted to compensate for the impedance changes of the PMOS transistors 232 and 234.

The error amplifier 306 controls the PMOS transistors 232 and 234 to provide a relatively constant impedance independent of ambient fluctuations. The error amplifier 306 has an inverted input coupled with a reference voltage node 322, a non-inverted input coupled with the reference current node, and an output coupled with the second bias signal node 226. The output of the error amplifier 306 provides a second bias voltage at the second bias input node 226. The error amplifier 306 is configured to control a voltage at the reference current node 324 based on a voltage at the reference voltage node 322. The error amplifier 306 provides a gate voltage for the replica transistor 308 at the second bias signal node 226. The output impedance for the replica transistor 308 may be calibrated by controlling a source-to-gate voltage for the replica transistor to provide a drain-to-source voltage $V_4$ that is substantially equal to a reference voltage $V_3$.

The reference voltage source 302 is coupled between the positive supply voltage node 208 and the negative supply voltage node 230. The reference voltage source 302 generates the reference voltage $V_3$ at a reference voltage node 322. The reference voltage $V_3$ is referenced to the positive supply voltage applied at the postive supply voltage node and a band gap reference voltage applied at a band gap reference node 326. The reference voltage source 302 includes a second reference current source 310 and a pull-up device 312. The second reference current source 310 is coupled between the reference voltage node 322 and the negative supply voltage node 230. The second reference current source 310 provides a current $I_1$ at the reference voltage node 322.

The pull-up device 322 is coupled between the positive supply voltage node 208 and the reference voltage node 322. The pull-up device 312 has an impedance R2. The pull-up device 312 generates the reference voltage $V_3$ at the reference voltage node 322 in response to the reference current $I_1$ at the voltage reference node 322. In an embodiment, the pull-up device 312 is a resistor having an impedance substantially 10 kilo-Ohms.

The second reference current source 310 includes a second reference current transistor 314, a resistive device 318, and an second amplifier 316. The second reference current source 310 may include a band gap reference voltage generator 320 configured to generate a bad gap reference voltage $V_1$ at a band gap reference node 326.

The second reference current transistor 314 has a drain coupled with the reference voltage node 322, a source coupled with a first reference transistor source node 328, and a gate coupled with a first reference transistor gate node 330. The second reference current transistor 314 is configured to generate the reference current $I_1$ at the reference voltage node 322.

The resistive device 318 is coupled between the negative supply voltage node 230 and the reference transistor source node 328. The resistive device 318 has an impedance R1 and is configured as provide a desired reference current $I_1$. In an embodiment, the resistive device has an impedance R1 substantially 24 kilo-Ohms.

The second amplifier 316 has an inverted input coupled with the reference current source node 328 and a non-inverted input coupled with the band gap reference node 326. The error second amplifier 316 has an output coupled with the reference current gate node 330. The second amplifier 316 controls a voltage $V_2$ at the reference transistor source node 328.

The first reference current source 304 is coupled with the reference current node 324 and the negative supply voltage node 230. The first reference current source 304 draws a calibrated reference current $I_{ref}$ at the reference current node. The reference current $I_{ref}$ establishes the source-to-drain current of the replica transistor 308 and thereby programming the impedance of the replica transistor 308.

Figure 4:
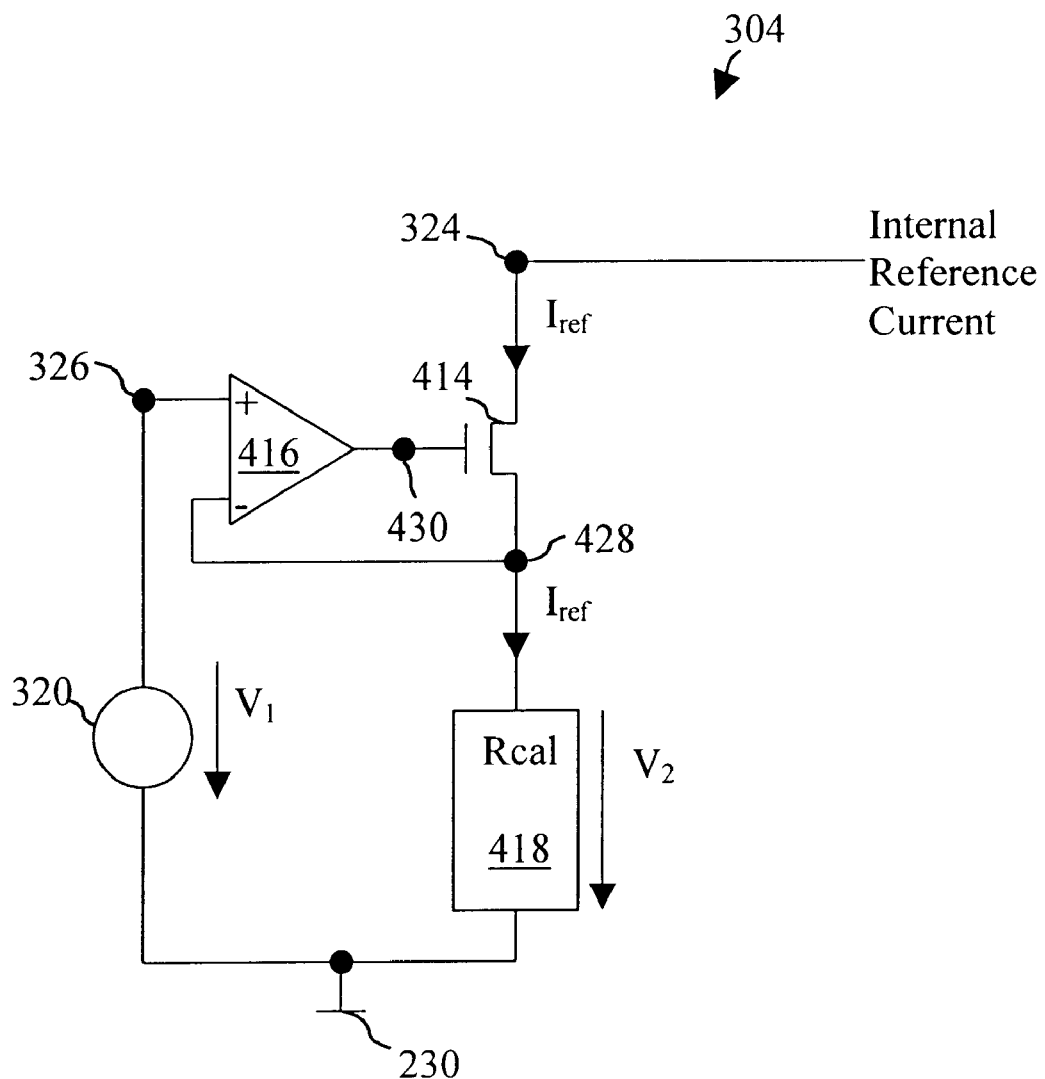
FIG. 4 is a schematic diagram for an embodiment of a reference current source for a write output driver.

Referring now to FIG. 4, a circuit for an embodiment of the first reference current source 304 is shown. The first current source 304 includes a first reference current transistor 414, a low-tolerance resistive device 418, and a first amplifier 416. The first reference current source 304 may include the band gap reference voltage generator 320 configured to generate a bad gap reference voltage $V_1$ at a band gap reference node 326.

The first reference current transistor 414 has a drain coupled with reference current node 324, a source coupled with a first reference transistor drain node 428, and a gate coupled with a first reference transistor gate node, the first reference current transistor being operative to generate the reference current $I_{ref}$ between the reference current node 324 and the first reference transistor drain node 428.

The low-tolerance resistive device 418 is coupled with the negative supply voltage node 230 and the first reference transistor drain node 428. The resistive device 418 is a precise resistive element having an impedance Rcal. The resistive device 418 is calibrated to a provide a desired reference current $I_{ref}$. The desired reference current $I_{ref}$ is inversely proportional to the resistance of resistive device 418. The impedance Rcal is substantially between 500 Ohms and 20 kilo-Ohms and having a tolerance less than 15%. In an embodiment, the resistive device is an external resistor coupled with the first reference current source 304. In another embodiment, the resistive device may be an internal polysilicon resistive element that may be laser-fused to provide the calibrated resistance Rcal having a tolerance less than 15%.

The first amplifier 416 has an inverted input coupled with the reference transistor drain node 428, a non-inverted input coupled with the band gap reference node 326, and an output coupled with the first reference current gate node 430. The first amplifier 416 controls the voltage at the reference transistor drain node 428 to provide a substantially stable reference current $I_{ref}$ through the low-tolerance resistive device 418.

In an embodiment, the second reference current transistor 314 and the first reference current transistor 414 are each NMOS transistors that have a channel width approximately 0.18 micron and operable at 1.8 Volts or less. The first amplifier 416, the second amplifier 316 and the error amplifier 306 are operation amplifier circuits having a gain substantially between 40 dB and 80 dB. The band gap reference voltage generator 320 may be any internal voltage generator configured to provide a band gap reference voltage. In an embodiment, the band gap reference voltage is substantially between 1.1 and 1.3 Volts.

Figure 5:
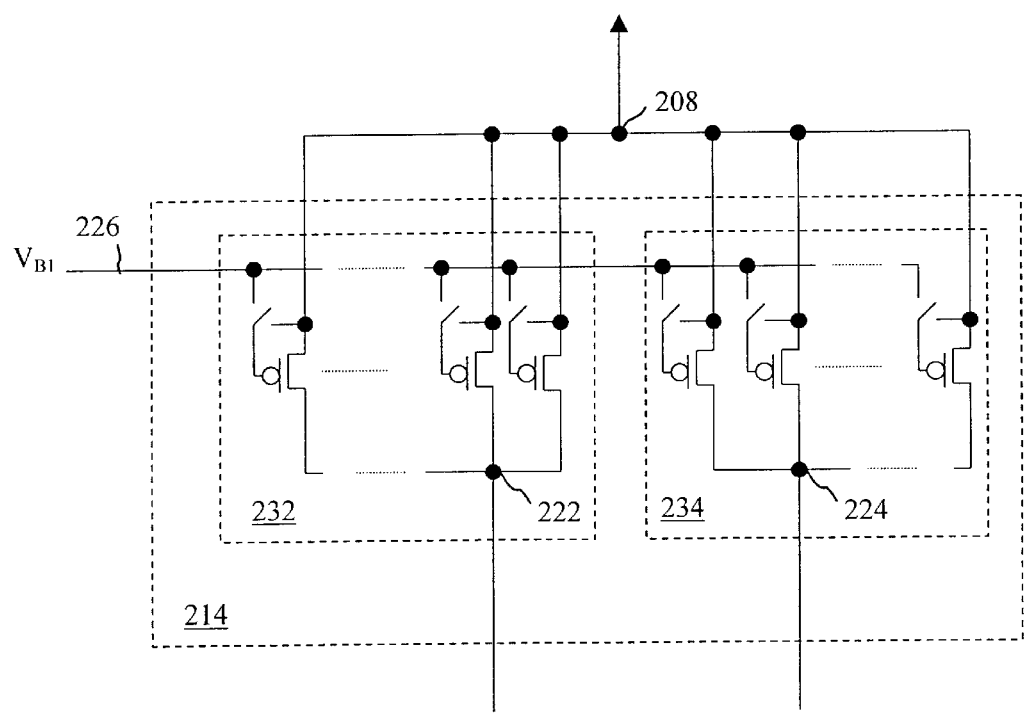
FIG. 5 is a schematic diagram for an embodiment of an internal pull-up circuit.

Referring now to FIG. 5, an alternate embodiment of the internal pull-up circuit 214 is shown. The internal pull-up circuit 214 includes a first plurality PMOS transistors 532 coupled with the first output node 222 and a second plurality of PMOS transistors 534 coupled with the second output node 224. The PMOS transistors 532 and 534 are configured as pull-up resistive devices. The PMOS transistors 532 and 534 each have a source coupled with the positive supply voltage node 208. The first plurality of PMOS transistors 532 each have a drain coupled with the first output node 222 and the second plurality of PMOS transistors 534 each have a drain coupled with the second output node 224. The PMOS transistors each have a gate that is selectively switched with the second bias signal node 226 or the positive supply voltage node 208. The output impedance at the output nodes 222 and 224 may be programmed by selectively switching the gate to the positive supply voltage node 208 or the second bias signal node 226. When the gate for one of the plurality of PMOS transistors 532 and 534 is coupled to the positive supply voltage node, the PMOS transistor turns off and increases the output impedance at the output node 222 and 224. Alternatively, when the gate for one of the plurality of PMOS transistors 532 and 534 is coupled with the second bias signal node 226, the transistor turns on and the output impedance at the output node 222 and 224 is reduced. The plurality of transistors 532 and 534 may each have substantially the same channel length and width. The plurality of PMOS transistors 532 and 534 may include any number of multiple PMOS transistors. In an embodiment, the plurality of PMOS transistors 532 and 534 each include a maximum of 63 PMOS transistors.

In another embodiment, the plurality of PMOS transistors 532 and 534 have substantially the same channel length and binary weighted channel widths. Specifically, an Nth PMOS transistor has a width $W_N$ equal to $2^{(N-1)}*W_0$, wherein $W_0$ is the channel width for a transistor having a shortest channel of the plurality of N PMOS transistors 532 and 534. With each of the plurality of PMOS transistors 532 and 534 having a binary weighted channel width, each of the plurality of PMOS transistor have an impedance that is one half an impedance of a preceding transistor.

Figure 6:
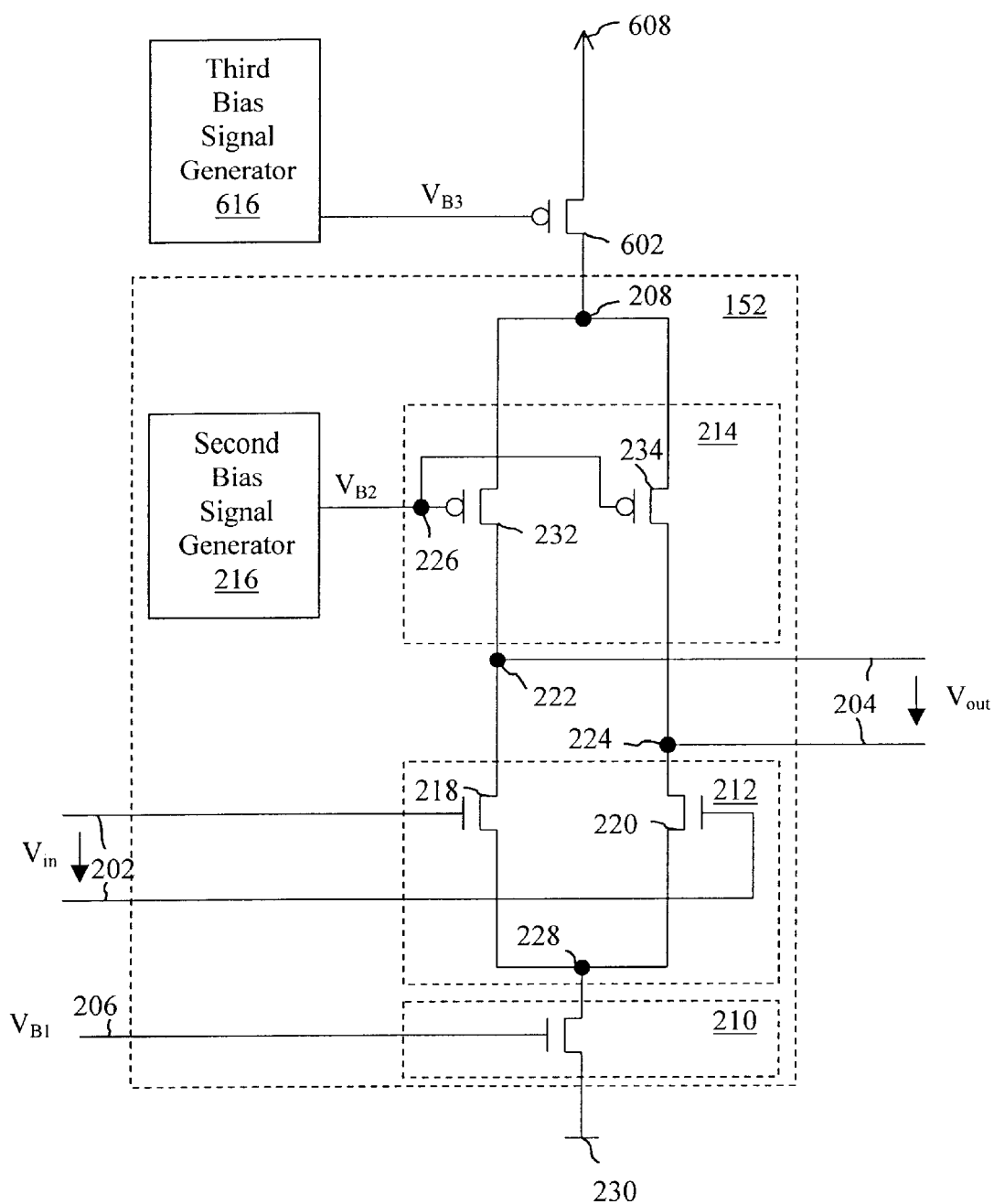
FIG. 6 is a schematic diagram for an alternate embodiment for a write output driver.

Referring now to FIG. 6, an embodiment for a write output driver 152 is shown that is configured to provide a programmable common mode output voltage. The embodiment with a programmable common-mode output voltage includes the write output driver 152 of Figure of 2, a common-mode pull-up device 602, and a third bias signal generator 616. The common-mode pull-up device 602 includes a drain coupled to the supply voltage node 208 and a source coupled with the positive supply voltage node 608. The common-mode pull-up device 602 includes a gate that is coupled with a third bias signal generator 616. In an embodiment the third bias signal generator 616 is configured as described for the second bias signal generator 216 of FIG. 3. The third bias signal generator 616 is configured to control a common mode output voltage at the output nodes 222 and 224 by varying a third bias signal provided to the common mode pull-up device 602. In an embodiment, the common-mode pull up device 602 is a resistor having an impedance of 10 Ohms. In another embodiment, the common mode pull up device 602 is a PMOS transistor configured as a resistive device having a programmable resisitance based on the third bias signal. In further embodiment, the common-mode pull-up device may be configured as with a plurality of PMOS transistors as described in FIG. 5.

Figure 7:
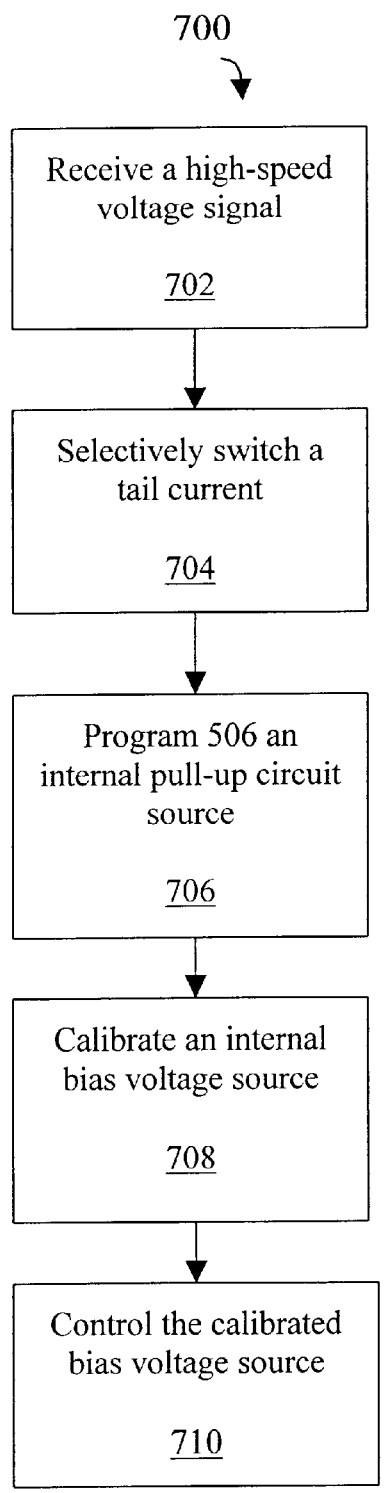
FIG. 7 is a flowchart for a method for driving a high-speed voltage signal.

Referring now to FIG. 7, a flowchart 700 for an embodiment for a method for driving a high-speed signal, the method comprising the acts of receiving 702 a high-speed voltage signal at a differential voltage input, selectively switching 704 a tail current, programming 706 an internal pull-up circuit, calibrating 508 an internal bias signal source, and controlling 710 the calibrated bias voltage source.

The act of selectively switching 704 a tail current includes switching the tail current to a first output node and a second output node. The tail current is switched to the first output node and the second output node in response to the high-speed voltage signal received at the differential voltage input.

The act of programming 706 may include adjusting a programmable resistive pull-up circuit coupled with the first output node and the second output node to generate an output voltage with low output impedance. The act of programming 706 may further include adjusting an impedance of a matched PMOS transistor pair coupled with the first output node and the second output node to provide a desired output voltage.

The act of calibrating 708 may include adjusting an impedance of the internal bias signal source to generate a bias signal at an bias signal output. The bias signal output has an output impedance substantially matched with the output impedance of the internal pull-up circuit. In an embodiment, the act of calibrating 508 includes setting an impedance of a replica transistor to have substantially the same impedance as the PMOS matched pair transistors. The impedance of the replica transistor is set by selecting a resistance of low-tolerance resistor coupled thereto.

The act of controlling 710 may include providing a bias voltage to the matched pair PMOS transistors to maintain a substantially constant output impedance for the internal pull-up circuit.

All of the components of the write output driver with internal programmable pull-up resistors may be integrated with the read/write channel on a single integrated circuit semiconductor chip. Alternatively, some or all of the components of the write output driver circuit may be implemented in one or more integrated circuits external to a read/write channel.

While particular embodiments of the present invention have been shown and described, modifications may be made. It is therefore intended in the appended claims, including all equivalents, cover all such changes and modifications.

What is claimed is:

1. A write output driver, comprising:
   a variable tail current source operative to generate a tail current at a current node, the tail current being proportional to a first bias signal provided at a first bias input;
   a differential switch circuit coupled with the current node and being operative to selectively switch the tail current between a first output node and a second output in response to a input voltage provided at a voltage input node;
   an internal pull-up circuit being operative to generate an output voltage between the first output node and the second output node in response to the tail current, the pull-up circuit having a programmable output impedance based on a second bias signal received at a second bias input node; and
   a second bias signal generator operative to generate the second bias signal at the second bias input node.

2. The write output driver of claim 1, wherein the variable tail current source comprises an NMOS transistor configured to generate a tail current at the current node in response to the first bias signal.

3. The write output driver of claim 2, wherein the differential switch circuit comprises a differential NMOS transistor pair arranged to selectively switch the tail current between the first output node and the second output node based on the input voltage.

4. The write output driver of claim 3, wherein the internal pull-up circuit comprises:
   a first pull-up impedance device having a programmable output impedance that is based on the second bias signal, the first pull-up impedance device being operative to generate an output voltage at the first output node in response to the tail current at the first output node; and
   a second pull-up impedance device having a programmable output impedance that is based on the second bias signal, the second pull-up impedance device being operative to generate an output voltage at the second output node in response to the tail current at the second output node.

5. The write output driver of claim 4, wherein the first pull-up impedance device and the second pull-up impedance device comprise a matched PMOS transistor pair having PMOS transistors configured as programmable resistors and having an output impedance based on the second bias signal.

6. The write output driver of claim 5, wherein the bias signal generator comprises a bias voltage source and the second bias signal comprises a second bias voltage generated by the bias voltage source.

7. The write output driver of claim 6, wherein the bias voltage source comprises an output having a variable output impedance calibrated to the impedance for the matched PMOS transistor pair.

8. The write output driver of claim 7, wherein the voltage source is operative to vary the second bias voltage to maintain the output impedance for the PMOS transistor pair.

9. The write output driver of claim 8, wherein the bias voltage source comprises:
   a reference voltage source coupled between a positive supply voltage node and a negative supply voltage node, the reference voltage node operative to generate a reference voltage at a reference voltage node;
   a first reference current source coupled between a reference current node and the negative supply voltage node, the first reference current source being operative to draw a calibrated reference current from the reference current node;
   an error amplifier having an inverted input coupled with reference voltage node, a non-inverted input coupled with the reference current node, and an output coupled with the second bias input node; and
   a replica transistor having a source coupled with the positive supply voltage node, a drain coupled with the reference current node, and a gate coupled with the second bias input node, the replica transistor having a programmable source-to-drain resistance and being operative to provide a second bias voltage at the second bias input node.

10. The write output driver of claim 9, wherein the reference voltage source comprises:
- a second reference current source coupled between the reference voltage node and the negative supply voltage node, the second reference current source operative to draw a second reference current at the reference voltage node; and
- a pull-up device coupled between the positive supply voltage node and the reference voltage node, the pull-up device being operative to provide the reference voltage at the reference voltage node in response to the reference current.

11. The write output driver of claim 10, wherein the first reference current source comprises:
- a first reference current transistor having a drain coupled with the reference current node, a source coupled with a first reference transistor source node, and a gate coupled with a first reference transistor gate node, the first reference current transistor being operative to generate the reference current between the reference current node and the first reference transistor source node;
- a first resistive device coupled between the negative supply voltage node and the first reference transistor source node, the first resistive device having a low-tolerance and being calibrated to a desired reference current, the desired reference current being inversely proportional to the first resistive device; and
- a first amplifier having an inverted input coupled with the first reference transistor source node, a non-inverted input coupled with a band gap reference node, and an output coupled with the first reference current gate node, the first amplifier being operative to control the reference current through the first reference current transistor.

12. The write output driver of claim 11, wherein the second reference current source comprises:
- a second reference current transistor having a drain coupled with the reference voltage node, a source coupled with a second reference transistor source node, and a gate coupled with a second reference transistor gate node, the second reference current transistor being operative to generate a second reference current at the voltage reference node;
- a second resistive device coupled between the negative supply voltage node and the second reference transistor source node, the second resistive device being operative to provide a desired reference voltage at the reference voltage node, the reference voltage being proportional to the second resistive device; and
- a second amplifier having an inverted input coupled with the second reference current drain node, a non-inverted input coupled with the band gap reference node, and an output coupled with the second reference gate node, the second amplifier being operative to control the second reference current through the second reference current transistor.

13. The write output driver of claim 12, wherein the replica transistor comprises a PMOS transistor having a programmable drain-to-source impedance, the drain-to-source impedance being programmed to proportionally match the impedance for each PMOS transistor of the matched PMOS pair.

14. The write output driver of claim 13, wherein the first reference transistor and the second reference transistor each comprise at least one NMOS transistor.

15. The write output driver of claim 14, wherein the error amplifier, first amplifier, and the second amplifier, each comprise an operational amplifier having a gain greater than 40 dB.

16. The write output driver of claim 15, wherein the first pull-up impedance device and the second pull-up impedance device each comprise a PMOS transistor array having N transistors each transistor having substantially equal channel length and channel width.

17. The write output driver of claim 16, wherein an ith PMOS transistor has a channel width substantially equal to $2^{(i-1)}*W_0$, wherein i is 1 to N, N being the number of transistors and $W_0$ being a channel width for a transistor having a minimum channel width.

18. The write output driver of claim 17, wherein the first resistive device comprises a low-tolerance external resistor having a tolerance less than 15%.

19. The write output driver of claim 18, wherein the first resistive device comprises a low-tolerance internal resistor.

20. The write output driver of claim 19, wherein the low-tolerance internal resistor is a poly silicon laser-fused resistor.

21. The write output driver of claim 20 comprising:
- a programmable common-mode pull-up device having a source coupled with the positive supply voltage node, a drain coupled with the internal pull-up device and a gate couple with a third bias signal node; and
- a third bias signal generator operative to generate a third bias signal at the second bias input node.

22. The write output driver of claim 21, wherein the common-mode pull-up device is a PMOS transistor configured as a resistive device.

23. The write output driver of claim 22, wherein the programmable common-mode pull-up device comprises a PMOS transistor array having N transistors each transistor having substantially equal channel length and channel width.

24. The write output driver of claim 23, wherein an ith PMOS transistor has a channel width substantially equal to $2^{(i-1)}*W_0$, wherein i is 1 to N, N being the number of transistors and $W_0$ being a channel width for a transistor having a minimum channel width.

25. The write output driver of claim 21, wherein the common-mode pull-up device is a resistor.

26. A method for driving a high-speed signal, the method comprising the acts of:
- receiving a high-speed voltage signal at a differential voltage input;
- selectively switching a tail current between a first output node and a second output node in response to the high-speed voltage signal at the differential voltage input;
- programming an internal pull-up circuit to generate an output voltage with low output impedance at the first output node and at the second output node in response to tail current at the first output node and the second output node;
- calibrating an internal bias voltage source to generate a bias voltage at an output having an output impedance substantially matched with the output impedance of the internal pull-up circuit; and
- controlling the calibrated bias voltage source to provide a bias voltage that maintains a substantially constant output impedance for the internal pull-up circuit.

27. The method of claim 21, wherein the act of programming the internal pull-up circuit comprises adjusting an output impedance of a matched PMOS transistor pair coupled with the first output node and the second output node to provide a desired output voltage.

28. The method of claim 22, wherein the act of calibrating an internal bias voltage source comprises adjusting a gate-to-source voltage of a replica transistor with a low-tolerance resistive device, the replica transistor configured to have an impedance to match the impedance of the PMOS transistor pair.

29. The method of claim 23, wherein the act of controlling the output impedance comprises varying the bias voltage to compensate for fluctuations of the output impedance of the matched PMOS transistor pair.

30. A hard-disk drive having a partial response, maximum likelihood based read/write channel including a write output driver, wherein the write output driver comprises:

a variable tail current source operative to generate a tail current at a current node, the tail current being proportional to a first bias signal provided at a first bias input;

a differential switch circuit coupled with the current node and being operative to selectively switch the tail current between a first output node and a second output in response to a input voltage provided at a voltage input node;

an internal pull-up circuit being operative to generate an output voltage between the first output node and the second output node in response to the tail current, the pull-up circuit having a programmable output impedance based on a second bias signal received at a second bias input node; and a second bias signal generator operative to generate the second bias signal at the second bias input node.

* * * * *